(12) United States Patent
Poirot-Crouvezier

(10) Patent No.: US 10,062,912 B2
(45) Date of Patent: Aug. 28, 2018

(54) BIPOLAR PLATE OF AN ELECTROCHEMICAL CELL WITH LOW THICKNESS

(71) Applicant: Commissariat a l'energie atomique et aux energies alternatives, Paris (FR)

(72) Inventor: Jean-Philippe Poirot-Crouvezier, Saint Georges de Commiers (FR)

(73) Assignee: Commissariat A L'Energie Atomique et aux Energies Alternatives, Paris (FR)

( * ) Notice: Subject to any disclaimer, the term of this patent is extended or adjusted under 35 U.S.C. 154(b) by 0 days.

(21) Appl. No.: 15/467,363

(22) Filed: Mar. 23, 2017

(65) Prior Publication Data

US 2017/0279132 A1    Sep. 28, 2017

(30) Foreign Application Priority Data

Mar. 24, 2016   (FR) ...................... 16 52543

(51) Int. Cl.
  *H01M 8/0267* (2016.01)
  *H01M 8/0254* (2016.01)
  *H01M 8/0206* (2016.01)
  *H01M 8/0265* (2016.01)

(52) U.S. Cl.
  CPC ....... *H01M 8/0267* (2013.01); *H01M 8/0206* (2013.01); *H01M 8/0254* (2013.01); *H01M 8/0265* (2013.01)

(58) Field of Classification Search
  CPC ............ H01M 8/0267; H01M 8/0254; H01M 8/0206; H01M 8/0265
  See application file for complete search history.

(56) References Cited

U.S. PATENT DOCUMENTS

| 2005/0058864 A1 | 3/2005 | Goebel |
| 2006/0029840 A1 | 2/2006 | Goebel |
| 2011/0212385 A1 | 9/2011 | Naoki |

FOREIGN PATENT DOCUMENTS

| JP | 2006-228580 | 8/2006 |
| JP | 2007-200700 | 8/2007 |

OTHER PUBLICATIONS

French Preliminary Search Report (with Written Opinion) dated Jun. 30, 2016 in French Application 16 52543 filed on Mar. 24, 2016 (with English Translation of Categories of Cited Documents).
Xianguo Li, et al., "Review of bipolar plates in PEM fuel cells: Flow-field designs", International Journal of Hydrogen Energy 30, 2005, 13 pgs.

*Primary Examiner* — Jane Rhee
(74) *Attorney, Agent, or Firm* — Oblon, McClelland, Maier & Neustadt, L.L.P.

(57) ABSTRACT

The invention pertains to a bipolar plate in which each of the distribution channels is located facing a dividing rib of the opposite conductive sheet; and in which said distribution channels include portions of various depths that are arranged so as to form a longitudinal alternation between:
  an enhanced distribution zone, in which:
    the distribution channels have a combined cross section of a high distribution value, and
    the cooling channels have a combined cross section of a low cooling value; and
  an enhanced cooling zone, in which:
    the distribution channels have a combined cross section of a value that is lower than the high distribution value, and
    the cooling channels have a combined cross section of a value that is higher than the low cooling value.

11 Claims, 5 Drawing Sheets

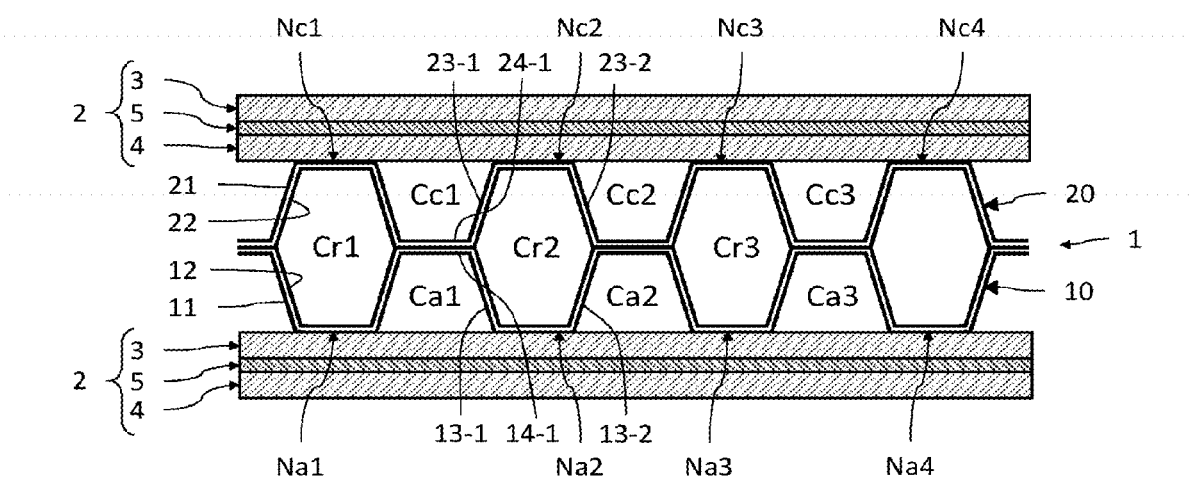
Fig.1
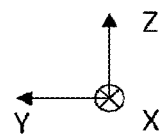

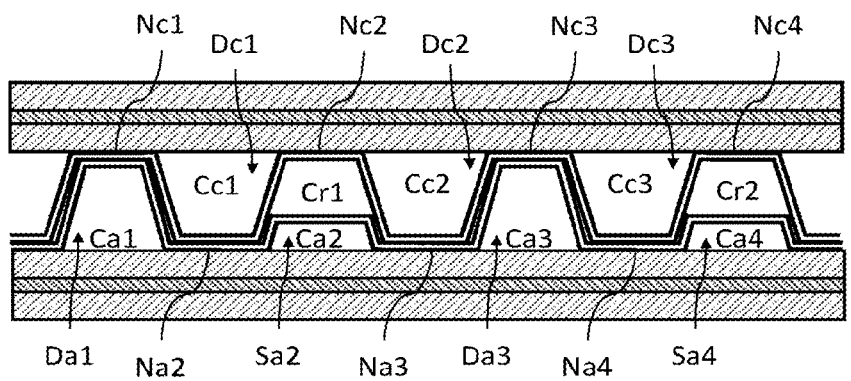
Fig.5A
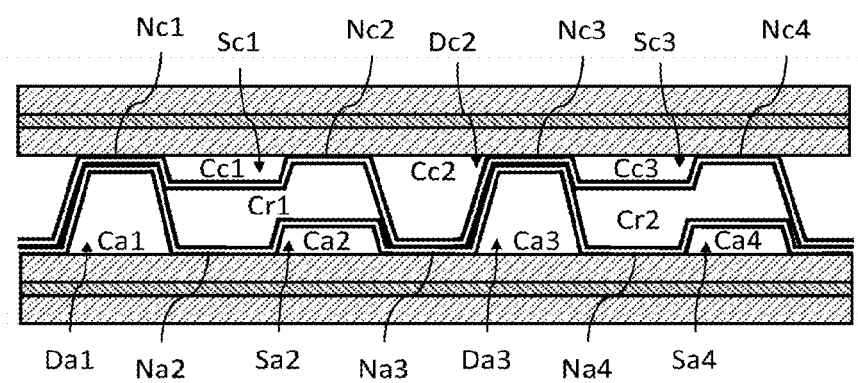
Fig.5B
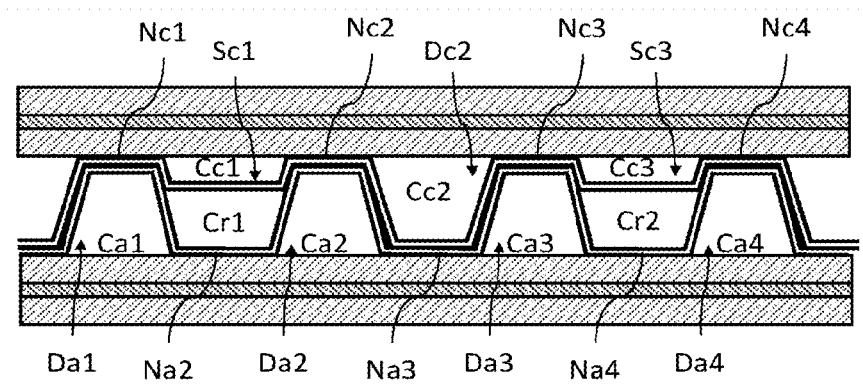
Fig.5C
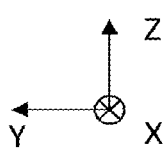

BIPOLAR PLATE OF AN ELECTROCHEMICAL CELL WITH LOW THICKNESS

TECHNICAL FIELD

The field of the invention is that of electrochemical reactors including a stack of electrochemical cells, such as fuel cells and electrolyzers, and more specifically relates to bipolar plates, of conductive sheet type, located between the electrodes of adjacent electrochemical cells.

STATE OF THE PRIOR ART

An electrochemical reactor, such as a fuel cell or an electrolyzer, conventionally includes a stack of electrochemical cells, each of which comprises an anode and a cathode that are electrically separated from each other by an electrolyte, an electrochemical reaction taking place in the cells between two reactants that are continuously fed thereto.

In a general manner, in the case of a fuel cell, the fuel (for example hydrogen) is brought into contact with the anode, while the oxidant (for example oxygen) is brought into contact with the cathode. The electrochemical reaction is subdivided into two half reactions, an oxidation reaction and a reduction reaction, which take place at the anode/electrolyte interface and at the cathode/electrolyte interface, respectively. To take place, the electrochemical reaction requires the presence of an ionic conductor between the two electrodes, namely the electrolyte, which is for example contained in a polymer membrane, and an electronic conductor formed by the external electrical circuit. The stack of cells is thus the site of the electrochemical reaction: the reactants must be supplied thereto and the products and any unreactive species must be removed therefrom, as must the heat produced during the reaction.

The electrochemical cells are conventionally separated from one another by bipolar plates that ensure the electrical interconnection of the cells. The bipolar plates usually include an anodic face, on which a circuit for distributing fuel is formed, and a cathodic face, opposite the anodic face, on which a circuit for distributing oxidant is formed. Each distributing circuit takes the form of a network of channels that are, for example, arranged in parallel or have undulations, or are transversely offset, in the plane (X, Y) of the bipolar plate, in order to bring the reactive species uniformly to the corresponding electrode. The bipolar plates may also include a cooling circuit formed from a network of internal ducts that allow a head-transfer fluid to flow and thus the heat produced locally during the reaction in the cell to be removed.

FIG. 1 is a partial schematic view in cross section of adjacent electrochemical cells in which neighbouring membrane/electrode assemblies 2 are separated from one another by a bipolar plate 1. The bipolar plate 1 is here formed from two electrically conductive sheets 10, 20 that are joined to one another in the direction of stacking of the electrochemical cells. They feature reliefs, or embossments, forming both the channels Ca, Cc of the distribution circuits on the outer faces 11, 21 of the sheets, and the channels Cr of the cooling circuit between the inner faces 12, 22 of the sheets. The conductive sheets 10, 20 may be made of metal and the reliefs formed by stamping.

The distribution channels Ca1, Ca2 of a first conductive sheet 10 are superposed onto those Cc1, Cc2 of the second, opposite conductive sheet 20, such that each distribution channel Ca1, Ca2 of one conductive sheet makes contact with a distribution channel Ca, Cc2 of the opposite conductive sheet at their respective channel back walls 14-1, 14-2, 24-1, 24-2. Moreover, the cooling channels Cr are adjacent to the distribution channels Ca, Cc in a plane parallel to the plane (X, Y) of the bipolar plate 1. More specifically, a cooling channel Cr2 is transversally delimited by the lateral walls 13-1, 23-1, 13-2, 23-2 of the distribution channels Ca1, Cc1, Ca2, Cc2 and by the ribs Na2, Nc2 that separate the distribution channels of one and the same conductive sheet from one another.

Nonetheless, there is a need for bipolar plates with conductive sheets having lower thickness, while allowing distribution and cooling fluids to flow properly through the respective channels.

DISCLOSURE OF THE INVENTION

One objective of the invention is to propose a bipolar plate of an electrochemical cell with conductive sheets, having a low thickness while allowing distribution and cooling fluids to flow properly. To this end, the subject of the invention is a bipolar plate intended to be positioned between two electrodes of adjacent electrochemical cells, including a first conductive sheet and a second conductive sheet each having an inner face and an outer face, the conductive sheets being joined to one another by the inner faces, and each including reliefs at least partially delimiting, on the outer faces, distribution channels that are intended to distribute reactive gases, the distribution channels of one and the same conductive sheet being separated pairwise by a dividing rib intended to make contact with one of said electrodes, and on the inner faces, cooling channels that are intended to allow the flow of a heat-transfer fluid.

According to the invention, each of said distribution channels is located facing a dividing rib of the opposite conductive sheet; and said distribution channels include portions of various depths that are arranged so as to form a longitudinal alternation between:

a first zone, referred to as an enhanced distribution zone, in which:
        the distribution channels have a combined cross section of a first value, referred to as a high distribution value, and
        the cooling channels have a combined cross section of a first value, referred to as a low cooling value; and a second zone, referred to as an enhanced cooling zone, in which:
        the distribution channels have a combined cross section of a value that is lower than the high distribution value, and
        the cooling channels have a combined cross section of a value that is higher than the low cooling value.

Certain preferred, but non-limiting, aspects of this bipolar plate are the following:

Some distribution channels may have, in the enhanced distribution zones, a portion the depth of which is referred to as the nominal depth; and, in the enhanced cooling zones, a portion the depth of which, referred to as the decreased depth, is less than the nominal depth.

Each distribution channel may include a back wall connected to the adjacent dividing ribs, the portions of nominal depth making mechanical contact with the opposite dividing ribs via their back wall.

In the enhanced distribution zones, some distribution channels may have a portion the depth of which is referred to as the nominal depth, and other distribution channels may have a portion the depth of which, referred to as the decreased depth, is less than the nominal depth.

At least one cooling channel may extend, in the enhanced distribution zones, between the back wall of a portion of decreased depth of a distribution channel and an opposite dividing rib.

In the enhanced distribution zones, said cooling channel may be transversally delimited by two portions of nominal depth of distribution channels of the same conductive sheet.

A distribution channel may have a portion of decreased depth in a first enhanced distribution zone, and a portion of nominal depth in a second enhanced distribution zone that is successive to the first zone.

The cooling channels may have, in the enhanced distribution zones, a transverse dimension, in the plane of the bipolar plate, of a first value and, in the enhanced cooling zones, a transverse dimension of a value that is higher than said first value.

In at least one enhanced cooling zone, there may be a communication of fluid between all of the cooling channels.

The distribution channels of a conductive sheet that is intended to make contact with a cathode of an electrochemical cell may have portions of nominal depth in the enhanced distribution zones.

The invention also pertains to an electrochemical cell, including:
- a bipolar plate according to any one of the preceding features;
- a membrane/electrode assembly, one of said electrodes of which is in contact with the first or the second conductive sheet of the bipolar plate.

BRIEF DESCRIPTION OF THE DRAWINGS

Other aspects, aims, advantages and features of the invention will become more clearly apparent upon reading the following detailed description of preferred embodiments thereof, which description is provided by way of non-limiting example and with reference to the appended drawings, including FIG. 1 described above, in which:

FIGS. 2A to 2C are cross-sectional views schematically illustrating a bipolar plate according to one embodiment, located between two neighbouring membrane/electrode assemblies, in which FIGS. 2A and 2C illustrate two successive enhanced distribution zones, which are different from one another, and in which FIG. 2B illustrates an enhanced cooling zone;

FIGS. 5A to 5C are cross-sectional views schematically illustrating a bipolar plate according to another embodiment, located between two neighbouring membrane/electrode assemblies.

DETAILED DESCRIPTION OF PARTICULAR EMBODIMENTS

In the figures and in the subsequent description, the same references represent identical or similar elements. Moreover, the various elements are not represented to scale so as to enhance the clarity of the figures. Moreover, the various embodiments and variants are not mutually exclusive and can be combined with one another.

Various embodiments and variants will be described with reference to a fuel cell and in particular to a PEM (proton exchange membrane) fuel cell, the cathode of which is supplied with oxygen and the anode of which with hydrogen. However, the invention is applicable to any type of fuel cell, and in particular to those operating at low temperatures, i.e. temperatures below 200° C., and to electrochemical electrolyzers.

Figure 2A:
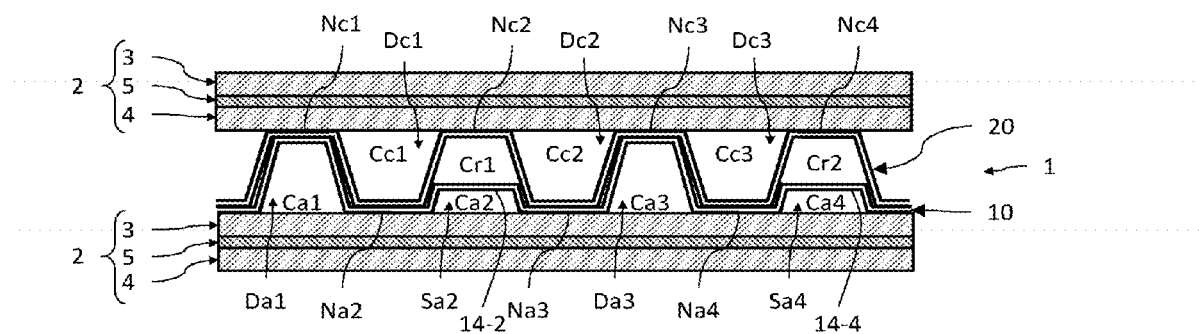
Figure 2B:
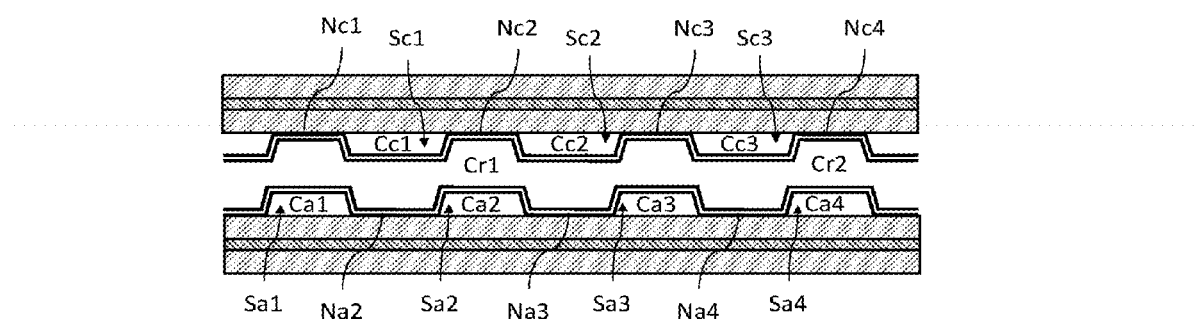
Figure 2C:
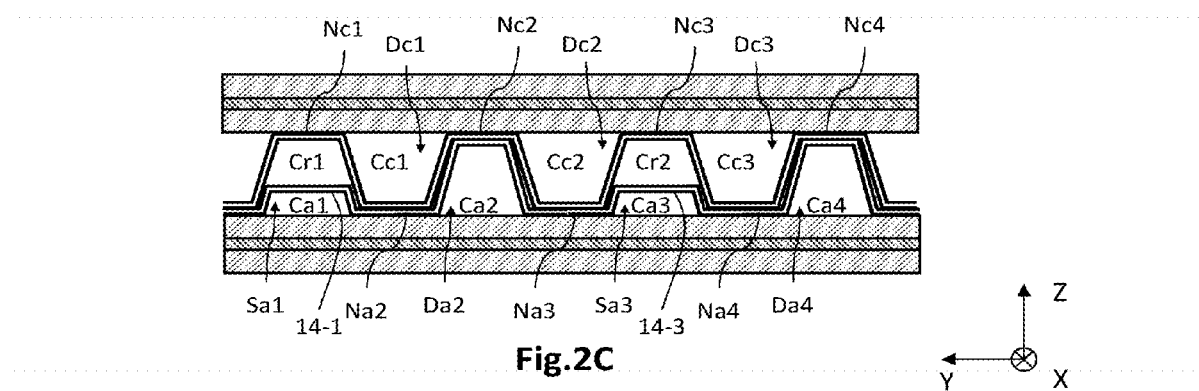

FIGS. 2A to 2C are partial schematic illustrations in cross section of an exemplary bipolar plate 1 of an electrochemical cell according to one embodiment.

The electrochemical cells here belong to a stack of cells of a fuel cell. Each electrochemical cell includes a membrane/electrode assembly 2 formed from an anode 3 and a cathode 4 that are separated from each other by an electrolyte 5, here comprising a polymer membrane. The membrane/electrode assemblies 2 of the electrochemical cells are placed between bipolar plates 1 that are capable of bringing reactive species to the electrodes and of removing the heat produced during the electrochemical reaction.

A direct orthonormal coordinate system (X, Y, Z) is defined here and will be referred to in the rest of the description, where the Z axis is oriented along the axis of stacking of the electrochemical cells and along the thickness of the bipolar plate, and where the X and Y axes define a plane parallel to the plane of the bipolar plate.

In a manner known per se, each electrode 3, 4 includes a gas diffusion layer (GDL), placed in contact with a bipolar plate 1, and an active layer located between the membrane 5 and the diffusion layer. The active layers are the site of electrochemical reactions. They include materials allowing the oxidation and reduction reactions at the respective interfaces of the anode and cathode with the membrane to take place. The diffusion layers are made from a porous material that permits the diffusion of the reactive species from the distributing circuit of the bipolar plates 1 to the active layers, and the diffusion of the products generated by the electrochemical reaction to the same distributing circuit.

Each bipolar plate 1 is formed from two conductive sheets 10, 20 that are bonded and joined to one another, these conductive plates being stamped so as to form circuits for distributing reactive gases over the electrodes 3, 4 of each of the electrochemical cells, and a cooling circuit located between the conductive sheets 10, 20. Thus, a first conductive sheet 10, referred to as an anodic conductive sheet, is intended to make contact with the anode 3 of a membrane/electrode assembly 2 of an electrochemical cell, while the second conductive sheet 20, referred to as a cathodic conductive sheet, is intended to make contact with the cathode 4 of a membrane/electrode assembly 2 of an adjacent electrochemical cell.

As also illustrated in FIG. 1, each conductive sheet 10, 20 includes an outer face 11, 21 and an opposite inner face 12, 22, the conductive sheets 10, 20 being joined to one another by the inner faces 12, 22. An outer face 11, 21 is referred to as an anodic outer face when it is intended to make contact with the anode 3 of an electrochemical cell, or as a cathodic outer face when it is intended to make contact with the cathode 4 of the adjacent electrochemical cell. The anodic face of a conductive sheet 10, 20 includes the circuit for distributing a reactive gas, for example hydrogen, and the cathodic face of the other conductive sheet includes a circuit for distributing a reactive gas, for example air or oxygen.

The conductive sheets 10, 20 take the form of laminae, or elementary plates of low thickness, made of an electrically conductive material, for example a metal or even a composite, for example a graphite-filled composite. The thickness may be of the order of a few tens of microns up to a few hundred microns in the case of metal sheets, for example from around 50 µm to 200 µm.

Each conductive sheet includes reliefs, or embossments, obtained for example by stamping or forming in a press, the form of which on one face is complementary to the form on the opposite face. These reliefs form, on the outer faces 11, 21, the circuits for distributing reactive gases and, on the inner faces 12, 22, a cooling circuit including channels through which a heat-transfer fluid is intended to flow.

As also illustrated in FIG. 1, each distribution channel Ca1, Cc1 is delimited by lateral walls 13-1, 23-1 which extend substantially along the Z axis of the thickness of the bipolar plate 1, the lateral walls 13-1, 23-1 of each channel being connected to one another by a back wall 14-1, 24-1. Each distribution channel, for example the channel Ca1, is separated from the neighbouring channels Ca1, Ca3 of the same distribution circuit by a wall, referred to as a dividing rib Na2, Na3, which connects the adjacent lateral walls of two adjacent distribution channels, this dividing rib being intended to come into contact with the corresponding electrode 3. Thus, the anodic and cathodic distribution channels are separated pairwise by respective anodic and cathodic dividing ribs. The dividing rib is a wall the surface of which may preferably be substantially planar.

It is possible to define a local depth of a distribution channel as the dimension along the Z axis between the back wall of the channel and a plane passing through the adjacent dividing ribs. It is also possible to define a local width of a dividing rib as the dimension of the rib in cross section. Furthermore, the term "adjacent", or "transversally adjacent", is understood to mean juxtaposed along an axis that is transverse to the longitudinal axis of a given channel.

According to the invention, each distribution channel is located facing a dividing rib of the opposite conductive sheet. The term "located facing" is understood to mean that the channel is located in line with, i.e. perpendicular to, a dividing rib along the Z axis corresponding to the thickness of the bipolar plate. More specifically, the back wall of a distribution channel of a conductive sheet is located in line with an opposite dividing rib along the Z axis, and not in line with a back wall of a distribution channel of the opposite conductive sheet. Furthermore, the term "distribution channel" is understood to mean some or all of the distribution channels of one and the same distribution network. Lastly, each distribution channel is located facing a dividing rib, over some or all of its length.

Thus, by virtue of this arrangement of the distribution channels of the two conductive sheets, the depth of one distribution channel is not limited by that of a distribution channel of the opposite conductive sheet, unlike in the example of the prior art described above. The depth of the distribution channels may therefore vary along the longitudinal axis between a nominal value for which the back wall advantageously makes contact with the opposite dividing rib, and a value, referred to as the decreased value, that is lower than the nominal value. Stated otherwise, each distribution channel may include portions of nominal depth and portions of decreased depth. The term "nominal depth" is understood to mean a depth ensuring a flow cross section that allows an optimal flow of fluid.

In this configuration, the thickness of the bipolar plate is then substantially decreased with respect to that of the bipolar plate according to the example of the prior art described above. Specifically, the thickness of the bipolar plate here corresponds substantially to the nominal depth of a distribution channel, by virtue of the thicknesses of the conductive sheets, while the thickness of the bipolar plate in the example of FIG. 1 corresponds to the sum of the nominal depths of an anodic channel and a cathodic channel that are superposed onto one another.

Moreover, in order to ensure, in addition, that the reactive gases and the heat-transfer fluid flow properly, the distribution channels include portions of various depths, these portions being arranged so as to form a longitudinal alternation between:
 a first zone, referred to as an enhanced distribution zone, in which:
  the distribution channels Ca, Cc have a combined cross section of a first value, referred to as a high distribution value, and
  the cooling channels Cr have a combined cross section of a first value, referred to as a low cooling value; and
 a second zone, referred to as an enhanced cooling zone, in which:
  the distribution channels have a combined cross section of a value, referred to as the low distribution value, that is lower than the high distribution value, and
  the cooling channels have a combined cross section of a value, referred to as the high cooling value, that is higher than the low cooling value.

The term "combined cross section", or "combined flow cross section", is understood to mean the sum of the cross sections of the passage of fluid through the channels in question, in a plane that is transverse to the longitudinal axis of the channels. This may be a combined flow cross section relating to the reactive gases or to the heat-transfer fluid. The high distribution value is preferably higher than the low cooling value, and a low distribution value is preferably lower than a high cooling value.

Furthermore, the term "alternate" is understood to mean that the various zones come one after the other in turns repeatedly, either periodically or not periodically, along the longitudinal axis of the channels.

Thus, the zones in which the distribution of the reactive gases is enhanced and the zones in which cooling by means of the flow of the heat-transfer fluid is enhanced alternate along a longitudinal axis of the channels. In particular, the value of the combined flow cross section of the distribution channels in the enhanced distribution zones is higher than the value that it has in the enhanced cooling zone, which results in a decrease in local head losses in the distribution channels at the enhanced distribution zones, thereby improving the local flow of the reactive gases. Furthermore, the value of the flow cross section of the cooling channels in the enhanced cooling zone is higher than the value that it has in the enhanced distribution zone, which results in a decrease in local head losses in the cooling channels at the enhanced cooling zones, thereby improving the local flow of the heat-transfer fluid.

FIG. 2A shows a cross section of the bipolar plate 1 in the first zone, referred to as the enhanced distribution zone. In this example, the cathodic distribution channels Cc1, Cc2, Cc3 have a portion Dc1, Dc2, Dc3 the depth of which is referred to as the nominal depth. The nominal depth of the cathodic channels is such that the back wall of the cathodic channels Cc1, Cc2, Cc3 is in mechanical contact with the corresponding anodic rib Na2, Na3, Na4. Here, the depth of each cathodic channel is nominal, such that the depth of two neighbouring cathodic channels, i.e. channels that are directly adjacent and separated by a dividing rib, is nominal. As a variant, the depths of the cathodic channels do not all have to be of the same value.

Some of the anodic distribution channels have a portion of nominal depth, here the anodic channel Ca1, Ca3, while others have a portion the depth of which, referred to as the decreased depth, is less than the nominal depth, here the channels Ca2, Ca4. In this example, the portions Da1, Da3 of nominal depth of the anodic channels are such that the back wall of the channels Ca1, Ca3 is in mechanical contact with the corresponding cathodic rib Nc1, Nc3. The portion Sa2, Sa4 of decreased depth of the channels Ca2, Ca4 is such that the corresponding back wall does not make contact with the facing cathodic rib Nc2, Nc4, but it nonetheless allows reactive gases to flow.

The cooling channels are located between two distribution channels of one and the same conductive sheet the depth of which is nominal, and are superposed onto distribution channels of the opposite conductive sheet the depth of which is decreased. Thus, the cooling channel Cr1 is superposed onto the portion Sa2 of the anodic channel Ca2 and is transversally bordered by the portions Dc1, Dc2 of the cathodic channels Cc1 and Cc2. It is therefore delimited along the Z axis by the back wall of the anodic channel Ca2 and by the opposite cathodic rib Nc2, and along the Y axis by the lateral walls of the cathodic channels Cc1 and Cc2.

This configuration is referred to as an enhanced distribution configuration to the extent that the value of the combined flow cross section of the cathodic and anodic distribution channels is a first high distribution value. Specifically, multiple distribution channels are of nominal depth, here namely the cathodic channels Cc1, Cc2, Cc3 and the anodic channels Ca1, Ca3. Thus, the distribution channels the depth of which is nominal exhibit low local head losses, thereby helping to ensure that the reactive gases flow properly.

This configuration also results in a local mechanical reinforcement of the bipolar plate to the extent that the lateral walls of the channels of nominal depth making contact with the opposite rib here allow the mechanical clamping forces to be transmitted directly into a membrane/electrode assembly of a membrane/electrode assembly cell of the neighbouring cell. With a constant clamping force, there is thus a decrease in the mechanical stresses to which the conductive sheets are subjected with respect to the configuration of FIG. 1 since, in a plane (X, Y), four, rather than two, lateral walls locally transmit the clamping force. Moreover, the transmission of the mechanical forces is improved to the extent that the mechanical forces are transmitted directly from a back wall of one conductive sheet to a dividing rib of the opposite conductive sheet. It is then possible to decrease the thickness of the conductive sheets, for example from 75 µm to 50 µm, while retaining equivalent mechanical strength, which results in a decrease in the overall thickness of the bipolar plate and hence an increase in the compactness of the stack of electrochemical cells.

FIG. 2B shows a cross section of the bipolar plate i in the second zone, referred to as the enhanced cooling zone. This second zone follows on from the first enhanced distribution zone along the longitudinal axis of the distribution and cooling channels, to the extent that said zones alternate longitudinally.

The value of the combined flow cross section of the cooling channels is here higher than the value that it has in the enhanced distribution zone illustrated in FIG. 2A. To achieve this, the distribution channels that border each cooling channel and the depth of which was nominal in the upstream enhanced distribution zone, now have a portion of decreased depth such that their back wall is no longer in mechanical contact with the opposite dividing rib. This is the case for example with the cathodic channels Cc1 and Cc2 facing the cooling channel Cr1, which have a portion Sc1, Sc2. Moreover, the distribution channel that was superposed onto the cooling channel and the depth of which was decreased in the upstream enhanced distribution zone illustrated in FIG. 2A, now has a portion of equally decreased depth. This is the case with the anodic channel Ca2 facing the cooling channel Cr1. Thus, the value of the flow cross section of the cooling channel Cr1 is higher than the value that it had in the upstream enhanced distribution zone illustrated in FIG. 2A. This results in an improved flow of the heat-transfer fluid through this channel, thereby improving the removal of the heat produced by the electrochemical cells in operation.

In this example, the anodic and cathodic distribution channels all have portions of decreased depth, such that the distribution channels are not in local mechanical contact with an opposite dividing rib, and a communication of fluid between the cooling channels Cr1 and Cr2 is ensured. This is due to the fact that the depths of the cathodic channels Cc2, Cc3 and of the anodic channel Ca3 are here decreased. Thus, the sum of the decreased depth of a cathodic channel and of the decreased depth of an anodic channel is lower than the thickness of the bipolar plate, the latter being defined as the distance along the Z axis between two parallel planes, one passing through the anodic ribs and the other passing through the cathodic ribs. The cooling channels Cr1, Cr2 therefore communicate with one another, which allows a transverse mixing of the flow of heat-transfer fluid, and hence improves the spatial uniformity of the removal of the heat produced.

The first and second zones alternate longitudinally, such that the distribution and cooling channels have successive zones in which the flow of the reactive gases and that of the heat-transfer fluid are enhanced in turn. This longitudinal alternation between the first and second zones is possible even though the thickness of the bipolar plate is low.

FIG. 2C shows a cross section of the bipolar plate 1 in the zone located downstream of the enhanced cooling zone illustrated in FIG. 2B, this zone being a new zone referred to as an enhanced distribution zone. This cross section is similar to that illustrated in FIG. 2A and is mainly distinguished therefrom in the cooling channels and anodic distribution channels.

The cathodic distribution channels Cc1, Cc2, Cc3 again have a portion Dc1, Dc2, Dc3 of nominal depth, and are here in mechanical contact, at their back wall, with the opposite anodic dividing ribs Na2, Na3, Na4.

Some of the anodic distribution channels have a portion of nominal depth while others have a portion of decreased depth that is less than the nominal depth. More specifically, the anodic channels which had portions of nominal and decreased depths, respectively, in the preceding enhanced distribution zone (FIG. 2A) now have portions of decreased and nominal depths, respectively. Thus, the channels Ca1 and Ca3 now have a portion Sa1, Sa3 of decreased depth, and the channels Ca2 and Ca4 now have a portion Da2, Da4 of nominal depth. Thus, each anodic distribution channel Ca alternates longitudinally between a portion Da of nominal depth and a portion Sa of decreased depth, from one enhanced distribution zone to the other.

The cooling channels are always located between two cathodic portions of nominal depth, and are superposed onto the anodic portions of decreased depth. Thus, the cooling channel Cr2 is now superposed onto the portion Sa3 of the anodic channel Ca3 and is transversally bordered by the portions Dc2, Dc3 of the cathodic channels Cc2 and Cc3. It is therefore delimited along the Z axis by the back wall of the anodic channel Ca3 and by the opposite cathodic rib Nc3, and along the Y axis by the lateral walls of the cathodic channels Cc2 and Cc3.

This enhanced distribution configuration helps to ensure that the reactive gases flow properly, as well as to increase mechanical reinforcement. Moreover, the fact that the cooling channels do not face the same distribution channels from one enhanced distribution zone to the other makes it possible to improve the uniformity of the distribution of the reactive gases and the removal of the heat produced by the electrochemical cells in operation.

In general, each distribution channel, whether it is on the anodic sheet or on the cathodic sheet, may have a portion of decreased depth the value of which may be different or identical to that of the other portions of decreased depth. By way of example, the depth value of the anodic portions of decreased depth may be lower than that of the cathodic portions of decreased depth.

Figure 3:
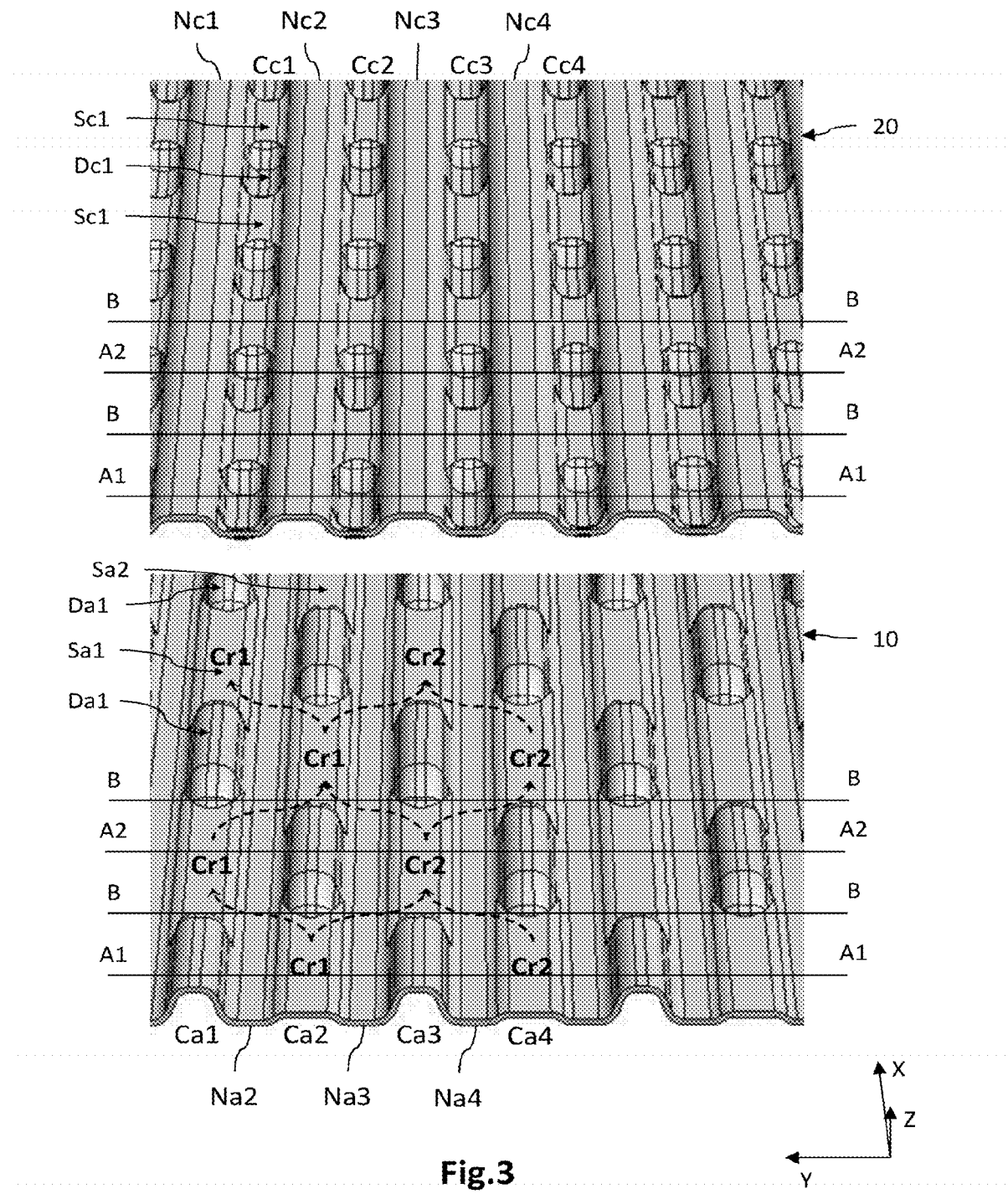
FIG. 3 is an exploded view in perspective of a portion of the bipolar plate illustrated in FIGS. 2A to 2C.

FIG. 3 is an exploded view in perspective of a portion of the bipolar plate 1 according to the embodiment illustrated in FIGS. 2A to 2C. The cathodic sheet 20 is located above, along the Z axis, the anodic sheet 10. Furthermore, transverse planes A1-A1 and A2-A2 are located in enhanced distribution zones as illustrated in FIG. 2A and 2C, and the transverse planes B-B are located in enhanced cooling zones as illustrated in FIG. 2B.

The cathodic conductive sheet 20 includes distribution channels Cc1, Cc2, Cc3 that extend in parallel to one another and here in a substantially rectilinear manner. Each cathodic channel, for example the channel Cc1, alternates longitudinally between a portion Dc1 of nominal depth and a portion Sc1 of decreased depth. The portions of nominal depth and of decreased depth, respectively, of the various cathodic distribution channels Cc are here positioned adjacently to one another, along the Y axis. Thus, in the planes A1-A1 and A2-A2, the cathodic channels Cc have portions Dc of nominal depth while in the planes B-B, they have portions Sc of decreased depth.

The anodic conductive sheet 10 includes distribution channels Ca1, Ca2, Ca3 that extend in parallel to one another and here in a substantially rectilinear manner. Each anodic channel, for example the channel Ca1, alternates longitudinally between a portion Da1 of nominal depth and a portion Sa1 of decreased depth. Unlike the cathodic channels, at least one portion Da1 of nominal depth of an anodic channel Ca1 is positioned adjacently along the Y axis to a portion Sa2 of decreased depth of a neighbouring anodic channel Ca2. In this example, each portion Da of nominal depth is adjacent, along the Y axis, to two portions Sa of decreased depth.

This longitudinal alternation between portions Da of nominal depth and portions Sa of decreased depth for the anodic channels Ca results in a transverse undulation, i.e. a local transverse offset, of the cooling channels Cr. Thus, the cooling channels Cr1, Cr2 undulate transversely along their longitudinal axis, and thus alternately come to face the anodic channels Ca1 then Ca2 for the channel Cr1, and to face the anodic channels Ca3 then Ca4 for the channel Cr2.

Moreover, in the enhanced cooling zones such as located in the transverse planes B-B and illustrated in FIG. 2, the cooling channels Cr1 and Cr2 communicate with one another, thereby allowing the heat-transfer fluid to mix, thus improving the uniformity of the removal of heat.

Each distribution channel of a conductive sheet is facing a dividing rib of the opposite conductive sheet, thereby allowing the thickness of the bipolar plate to be substantially decreased.

In this example, the back wall of the portions of nominal depth make contact with the opposite dividing rib, thereby ensuring a mechanical reinforcement of the bipolar plate.

Furthermore, the longitudinal alternation between the enhanced distribution zones and the enhanced cooling zones makes it possible to maintain a good flow of both the reactive gases and the heat-transfer fluid.

Moreover, the fact that each cathodic distribution channel has a portion of nominal depth in the enhanced distribution zones is particularly advantageous when the reactive gas distributed is oxygen contained in the air.

FIGS. 4A to 4I are a plurality of cross-sectional views of the bipolar plate shown in FIG. 3, illustrating a longitudinal alternation between the enhanced distribution zones and the enhanced cooling zones.

Figure 4A:
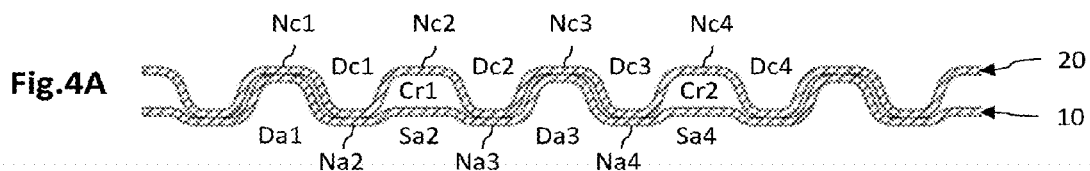
FIGS. 4A to 4I are cross-sectional views of the bipolar plate portion illustrated in FIG. 3, showing a longitudinal alternation between enhanced distribution zones and enhanced cooling zones.

FIG. 4A shows a first enhanced distribution zone identical to that illustrated schematically in FIG. 2A and to that of the cross section A1-A1 of FIG. 3. The cathodic channels here have a portion Dc of nominal depth, and here are in mechanical contact with the anodic dividing ribs Na. The anodic channels have portions Da1, Da3 of nominal depth, here in mechanical contact with the opposite cathodic ribs Nc1, Nc3, and portions Sa2, Sa4 of decreased depth such that the cooling channels Cr1 and Cr2 are superposed along the Z axis at these anodic portions Sa2, Sa4, and are located between the latter and the opposite cathodic ribs Nc2, Nc4.

Figure 4B:
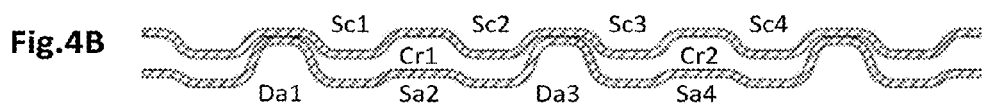
Figure 4C:
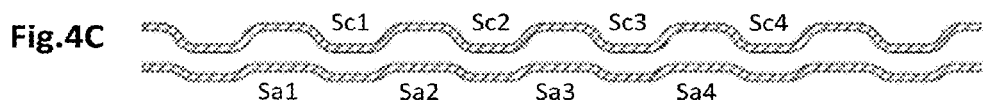

FIG. 4B shows an intermediate zone between the upstream enhanced distribution zone of FIG. 4A and the downstream enhanced cooling zone of FIG. 4C. In order to widen the cooling channels Cr1, Cr2 while ensuring mechanical contact between the conductive sheets, the cathodic channels that border each cooling channel now have a portion of decreased depth and are no longer in mechanical contact with the opposite anodic rib. Thus, the depth of the cathodic portions Sc1, Sc2 that border the channel Cr1 is decreased. The mechanical contact between the conductive sheets is here ensured by the anodic portions Da1, Da3 of nominal depth.

FIG. 4C shows an enhanced cooling zone identical to that illustrated schematically in FIG. 2B and to that of the cross section B-B of FIG. 3. The anodic and cathodic channels all have portions Sa, Sc of decreased depth such that there is a mutual communication of fluid between the cooling channels Cr1, Cr2. The heat-transfer fluid is then allowed to mix, and the local head losses in the cooling channels are substantially decreased. The flow of the heat-transfer fluid is then improved, along with the removal of the heat produced. In this example, the mechanical contact is no longer ensured between the two conductive sheets 10, 20, such that there is a communication of fluid between all of the cooling channels.

Figure 4D:
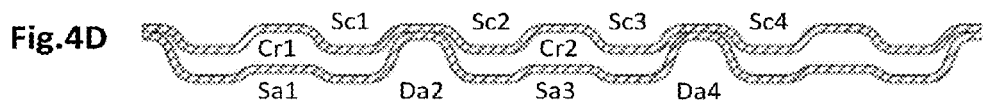
Figure 4E:
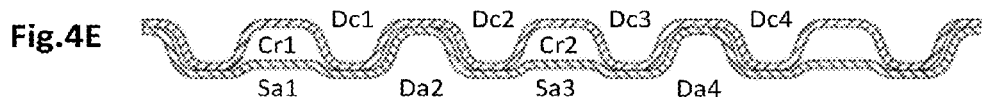
Figure 4F:
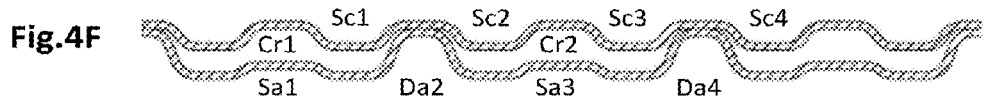

FIG. 4D shows an intermediate zone between the upstream enhanced cooling zone of FIG. 4C and the downstream enhanced distribution zone of FIG. 4E. The cathodic channels have a portion Sc of decreased depth and the anodic channels that had a portion Sa of decreased depth in the upstream enhanced distribution zone (FIG. 4A) now have a portion Da of nominal depth, such that here mechanical contact is ensured between the conductive sheets. The cooling channels Cr1, Cr2 are then positioned facing the anodic portions Sa1, Sa3 of decreased depth.

FIG. 4E shows a second enhanced distribution zone identical to that illustrated schematically in FIG. 2C and to that of the cross section A2-A2 of FIG. 3. The cathodic channels have a portion Dc of nominal depth, and here are in contact with the opposite anodic ribs Na. The depth of the anodic portions Da2, Da4 here is nominal and they are in contact with the opposite cathodic ribs Nc2, Nc4. The depth of the anodic portions Sa1, Sa3 here is decreased such that the cooling channels Cr1, Cr2 are superposed thereupon. This configuration ensures an optimal distribution of the reactive gases.

Figure 4G:
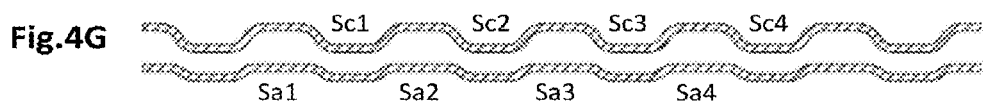
Figure 4H:
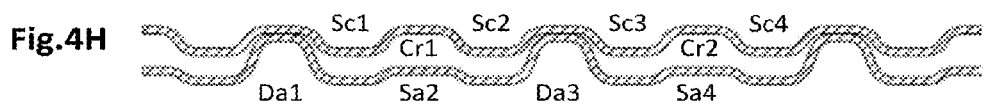
Figure 4I:
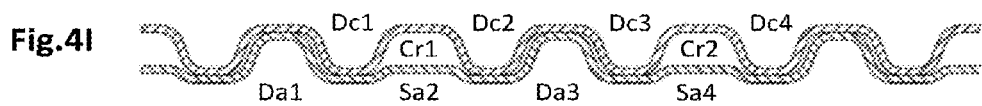

FIGS. 4G and 4I show a downstream enhanced cooling zone, identical to that of FIG. 4C, and a downstream enhanced distribution zone, identical to that of FIG. 4A, respectively. They are separated by intermediate zones that are similar to those described with reference to FIGS. 4B and 4D. These various zones are not described again in detail.

Various variants of and modifications to the embodiment described above will be apparent to those skilled in the art.

Thus, the distribution channels may extend longitudinally in a rectilinear manner or have undulations, or transverse offsets, in the plane (X, Y) of the bipolar plate.

Moreover, the distribution channels may have multiple zones in which the nominal depth and/or the decreased depth mutually differ, in particular between the input and the output of the distribution channels.

Furthermore, the distribution channels may extend longitudinally and have at least one zone in which they are mutually arranged as illustrated in FIG. 1, i.e. in which the anodic distribution channels are superposed onto the cathodic distribution channels, and at least one zone in which they are mutually arranged according to either of the embodiments of the invention described above, i.e. in which each distribution channel is located facing a dividing rib of the opposite conductive sheet and in which portions of various depths are arranged so as to form a longitudinal alternation.

The distribution channel portions of nominal depth are advantageously in mechanical contact with the opposite dividing ribs. Alternatively, the value of the nominal depth may be such that mechanical contact is not ensured either for the anodic channels or for the cathodic channels. A cooling channel may then be present between the back wall of the channel of nominal depth and the opposite dividing rib.

Cooling channels that are superposed onto anodic distribution channels in the enhanced distribution zones have been described. As a variant, they may be superposed onto the cathodic distribution channels.

Cooling channels that are superposed onto distribution channels of the same distribution circuit in the enhanced distribution zones, here namely certain anodic channels, have been described. As a variant, one or more cooling channels may additionally be superposed onto distribution channels of the opposite conductive sheet.

Thus, by way of illustration, FIGS. 5A to 5C are schematic views in cross section of two successive enhanced distribution zones (FIGS. 5A and 5C), which are different from one another, and are separated from one another by an enhanced cooling zone (FIG. 5B). The enhanced distribution zone illustrated in FIG. 5A is identical to that described with reference to FIG. 2A and is not described in detail again. The enhanced distribution zone illustrated in FIG. 5C is located downstream of the zone of FIG. 5A, and is mainly distinguished therefrom in that the cooling channel Cr1 that was previously superposed onto the anodic channel Ca2 and bordered by the cathodic channels Cc1 and Cc2 is now superposed onto the cathodic channel Cc1 and bordered by the anodic channels Ca1 and Ca2. Thus, certain anodic channels, such as the channels Ca1 and Ca3, have portions Da1, Da1 of nominal depth in two successive enhanced distribution zones. Here only the anodic channels Ca2 and Ca4 alternate between portions Da2, Da4 of nominal depth and portions Sa2, Sa4 of decreased depth.

Furthermore, as illustrated in FIG. 5B, it is possible for there to be no communication of fluid between the cooling channels Cr1, Cr2 in the enhanced cooling zones. In this example, the channels Cr1 and Cr2 are transversally separated by at least one distribution channel that has a portion of nominal depth in mechanical contact with the opposite dividing rib, as is the case here with the channels Cc2 and Ca3.

The various embodiments and variants may be fully or partly combined with one another and may be applied to the anodic distribution circuit and/or to the cathodic distribution circuit.

The invention claimed is:

1. Bipolar plate, intended to be positioned between two electrodes of adjacent electrochemical cells, including a first conductive sheet and a second conductive sheet each having an inner face and an outer face, the conductive sheets being joined to one another by the inner faces, and each including reliefs at least partially delimiting,
   on the outer faces, distribution channels that are intended to distribute reactive gases, the distribution channels of one and the same conductive sheet being separated pairwise by a dividing rib intended to make contact with one of said electrodes, and
   on the inner faces, cooling channels that are intended to allow the flow of a heat-transfer fluid;
wherein each of said distribution channels is located facing a dividing rib of the opposite conductive sheet;
and wherein said distribution channels include portions of various depths that are arranged so as to form a longitudinal alternation between:
   a first zone, referred to as an enhanced distribution zone, in which:
      the distribution channels have a combined cross section of a first value, referred to as a high distribution value, and
      the cooling channels have a combined cross section of a first value, referred to as a low cooling value; and
   a second zone, referred to as an enhanced cooling zone, in which:
      the distribution channels have a combined cross section of a value that is lower than the high distribution value, and
      the cooling channels have a combined cross section of a value that is higher than the low cooling value.

2. Bipolar plate according to claim 1, in which the distribution channels have, in the enhanced distribution zones, a portion the depth of which is referred to as the nominal depth; and, in the enhanced cooling zones, a portion the depth of which, referred to as the decreased depth, is less than the nominal depth.

3. Bipolar plate according to claim 2, in which each distribution channel includes a back wall connected to the adjacent dividing ribs, the portions of nominal depth making mechanical contact with the opposite dividing ribs via their back wall.

4. Bipolar plate according to claim 1, in which, in the enhanced distribution zones, some distribution channels have a portion the depth of which is referred to as the nominal depth, and other distribution channels have a portion the depth of which, referred to as the decreased depth, is less than the nominal depth.

5. Bipolar plate according to claim 4, in which at least one cooling channel extends, in the enhanced distribution zones, between the back wall of a portion of decreased depth of a distribution channel and an opposite dividing rib.

6. Bipolar plate according to claim 5, in which, in the enhanced distribution zones, said cooling channel is transversally delimited by two portions of nominal depth of distribution channels of the same conductive sheet.

7. Bipolar plate according to claim 1, in which a distribution channel has a portion of decreased depth in a first enhanced distribution zone, and a portion of nominal depth in a second enhanced distribution zone that is successive to the first zone.

8. Bipolar plate according to claim 1, in which the cooling channels have, in the enhanced distribution zones, a transverse dimension, in the plane of the bipolar plate, of a first value and, in the enhanced cooling zones, a transverse dimension of a value that is higher than said first value.

9. Bipolar plate according to claim 8, in which, in at least one enhanced cooling zone, there is a communication of fluid between all of the cooling channels.

10. Bipolar plate according to claim 1, in which the distribution channels of a conductive sheet that is intended to make contact with a cathode of an electrochemical cell have portions of nominal depth in the enhanced distribution zones.

11. Electrochemical cell, including:
a bipolar plate according to claim 1;
a membrane/electrode assembly, one of said electrodes of which is in contact with the first or the second conductive sheet of the bipolar plate.

* * * * *